US012620375B2

(12) United States Patent
Miyama

(10) Patent No.: US 12,620,375 B2
(45) Date of Patent: May 5, 2026

(54) RECOMMENDATION INFORMATION OUTPUT SYSTEM AND RECOMMENDATION INFORMATION OUTPUT METHOD

(71) Applicant: Roland Corporation, Shizuoka (JP)

(72) Inventor: Yusuke Miyama, Hamamatsu (JP)

(73) Assignee: Roland Corporation, Shizuoka (JP)

( * ) Notice: Subject to any disclaimer, the term of this patent is extended or adjusted under 35 U.S.C. 154(b) by 1045 days.

(21) Appl. No.: 17/730,172

(22) Filed: Apr. 26, 2022

(65) Prior Publication Data

US 2023/0206887 A1 Jun. 29, 2023

(30) Foreign Application Priority Data

Dec. 24, 2021 (JP) ................................ 2021-211137

(51) Int. Cl.
*G10F 1/02* (2006.01)

(52) U.S. Cl.
CPC ...................................... *G10F 1/02* (2013.01)

(58) Field of Classification Search
CPC ........................................................ G10F 1/02
USPC ........................................................... 84/601
See application file for complete search history.

(56) References Cited

U.S. PATENT DOCUMENTS

2015/0074544 A1* 3/2015 Tateno .................. G06Q 50/01
715/745

FOREIGN PATENT DOCUMENTS

JP 2021177219 11/2021

* cited by examiner

*Primary Examiner* — Jianchun Qin
(74) *Attorney, Agent, or Firm* — JCIPRNET

(57) ABSTRACT

In a server 70, usage counts of tone data of an electronic musical instrument 30, such as load counts of times that the tone data are loaded in the electronic musical instrument 30 are stored for each tone data and each user H utilizing the electronic musical instrument 30. When a recommendation information request is received from a portable terminal 50, the server 70 obtains a similar user similar to a request user included in the recommendation information request from the stored usage counts. Tone data to be recorded in the recommendation information are obtained from the usage count of each tone data of the request and the usage count of each tone data of the similar user, and the recommendation information is generated from the obtained tone data. Accordingly, the recommendation information generated by the user 70 can conform to the preference of the request user.

9 Claims, 10 Drawing Sheets

Usage count data 72c

| Identifier | Tone information | | | | | | | Usage frequency | | | | | | | | | | | |
|---|---|---|---|---|---|---|---|---|---|---|---|---|---|---|---|---|---|---|---|
| | | | | | | | | Usage count | | | | | | | | Usage time | | | |
| | Name | Category | Characteristic | Envelope | | | | Load count | | | | Edit count | | | | | | | |
| | | | | A | D | S | R | User 1 | User 2 | User 3 | . . | User 1 | User 2 | User 3 | . . | User 1 | User 2 | User 3 | . . |
| 1 | Rock piano | Piano | Bright | 0 | 80 | 0 | 40 | 100 | 100 | 1 | . . | 0 | 0 | 0 | . . | 100 | 100 | 1 | . . |
| 2 | Jazz piano | Piano | Dark | 0 | 80 | 0 | 40 | 5 | 0 | 5 | . . | 0 | 0 | 0 | . . | 5 | 0 | 5 | . . |
| 3 | Concert piano | Piano | Soft | 0 | 90 | 0 | 50 | 0 | 1 | 5 | . . | 0 | 0 | 0 | . . | 0 | 100 | 5 | . . |
| 4 | Stage piano | Piano | Slightly dark | 0 | 80 | 0 | 40 | 5 | 1 | 100 | . . | 0 | 0 | 10 | . . | 5 | 100 | 100 | . . |
| 5 | Hall piano | Piano | Hard | 0 | 80 | 0 | 40 | 0 | 0 | 1 | . . | 0 | 0 | 0 | . . | 0 | 0 | 1 | . . |
| 6 | Rock organ | Organ | Slightly dark | 10 | 40 | 127 | 10 | 10 | 20 | 0 | . . | 1 | 2 | 0 | . . | 10 | 20 | 0 | . . |
| 7 | Jazz organ | Organ | Hard | 10 | 40 | 127 | 10 | 1 | 1 | 10 | . . | 0 | 0 | 1 | . . | 1 | 1 | 10 | . . |
| 8 | Rock guitar | Guitar | Bright | 0 | 40 | 80 | 80 | 5 | 10 | 1 | . . | 0 | 100 | 0 | . . | 5 | 10 | 1 | . . |
| : | : | : | : | : | : | : | : | : | : | : | : | : | : | : | : | : | : | : | : |

FIG. 5

RECOMMENDATION INFORMATION OUTPUT SYSTEM AND RECOMMENDATION INFORMATION OUTPUT METHOD

CROSS-REFERENCE TO RELATED APPLICATION

This application claims the priority benefit of Japan application serial no. 2021-211137 filed on Dec. 24, 2021. The entirety of the above-mentioned patent application is hereby incorporated by reference herein and made a part of this specification.

BACKGROUND

Technical Field

The invention relates to a recommendation information output system and a recommendation information output method.

Description of Related Art

Patent Document 1 discloses a data utilization system S in which sound data stored in a server 10 is transmitted to an electronic musical instrument 50 via a PC 30 and a recording medium 45, and the transmitted sound data is utilized in the electronic musical instrument 50. The electronic musical instrument 50 can utilize not only the sound data built therein in advance, but also the sound data obtained from the server 10. Therefore, it is possible to enable performance with rich expression by using such sound data.

PRIOR ART DOCUMENT

Patent Document

[Patent Document 1] Japanese Laid-Open No. 2021-177219

In recent years, due to the increased size of the built-in memory of the electronic musical instrument 50, the volume of sound data which can be stored in the electronic musical instrument 50 has increased. Also, with the implementation of the subscription (flat-rate) system, sound data can be freely added to and updated in the electronic musical instrument 50 from the server 10, etc., through a network. Under such circumstance, it is difficult to play each sound of the sound data which can be utilized in the electronic musical instrument 50 and verify the sound by using the output sound.

Meanwhile, in the field of on-line shopping or on-line sales of music contents such as musical pieces, it is known to introduce purchase item candidates by providing alongside “recommendation information” in which products and/or contents recommended to the consumer are arranged as a ranking, for example. When generating such recommendation information, the purchase histories and/or the numbers of downloads of contents of buyer groups accumulated in the server are utilized.

However, in electronic musical instruments, such purchase histories and/or numbers of downloads do not necessarily reflect actual use of contents after the contents are downloaded or purchased. This is because that, once the contents are purchased or downloaded and stored in an electronic musical instrument, it is possible to henceforth load and use the stored contents, and therefore such contents are not downloaded multiple times. Moreover, in the subscription system, contents can be downloaded irrelevant of whether such contents are actually used. Therefore, contents hardly actually used while purchased or downloaded many times are still registered in the recommendation information. As a result, if such conventional technologies are put into use directly, there is a concern that contents not conforming to user preference may be presented as recommendation information.

SUMMARY

In order to achieve the objective, an information output system according to the invention includes: a frequency obtaining means, obtaining, from an electronic musical instrument storing a plurality of contents, a user identifier specifying a user at a time when the electronic musical instrument is used, a content identifier specifying a content used at the time, and a usage frequency of the content; a frequency storage means, storing in association the usage frequency obtained by the frequency obtaining means with the user identifier and the content identifier; and an output means, calculating a correlation degree between usage frequencies of contents stored in the frequency storage means and associated with a request user represented by a user identifier and usage frequencies of contents stored in the frequency storage means and associated with a user other than the request user, and outputting information relating to a content specified in accordance with the correlation degree and associated with the user identifier representing the user to be stored in the frequency storage means.

In addition, a recommendation information output method according to the invention includes: a frequency obtaining step of obtaining, from an electronic musical instrument storing a plurality of contents, a user identifier specifying a user at a time when the electronic musical instrument is used, a content identifier specifying a content used at the time, and a usage frequency of the content; a frequency storage step of storing in association the usage frequency obtained in the frequency obtaining step with the user identifier and the content identifier in a frequency storage means; and an output step of calculating a correlation degree between usage frequencies of contents stored in the frequency storage means and associated with a request user represented by a user identifier and usage frequencies of contents stored in the frequency storage means and associated with a user other than the request user, and outputting information relating to a content specified in accordance with the correlation degree and associated with the user identifier representing the user to be stored in the frequency storage means.

BRIEF DESCRIPTION OF THE DRAWINGS

FIG. 5 is a diagram schematically showing usage frequency data.

DESCRIPTION OF THE EMBODIMENTS

The invention has been made in view of the above issue, and an objective of the invention is to provide a recommendation information output system and a recommendation information output method capable of presenting recommendation information with contents conforming to user preference.

Figure 1:
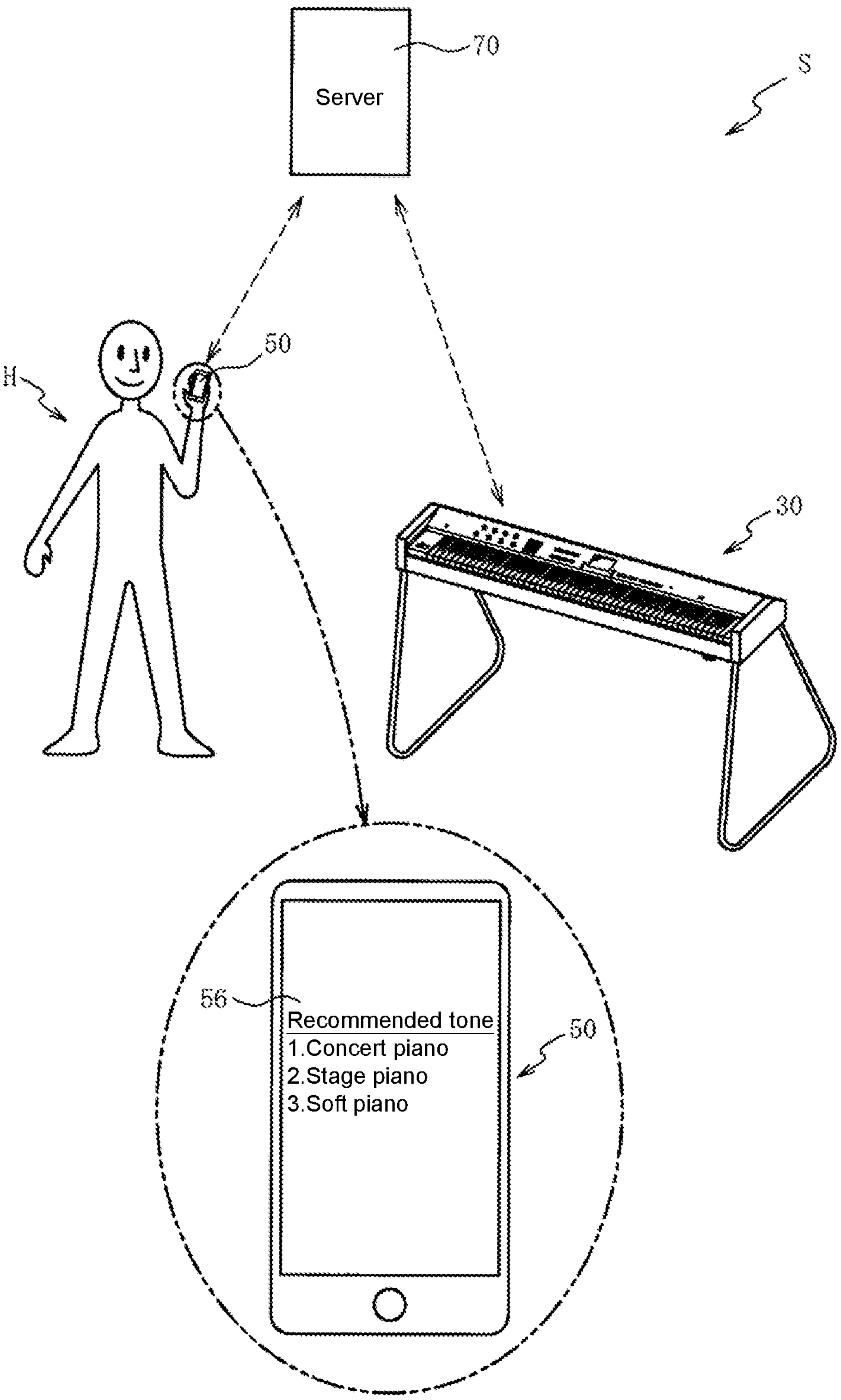
FIG. 1 is a diagram schematically illustrating a recommendation information output system.

Hereinafter, embodiments will be described with reference to the accompanying drawings. A recommendation information output system S according to the embodiment is schematically described with reference to FIG. 1. FIG. 1 is a diagram schematically illustrating the recommendation information output system S. As shown in FIG. 1, the recommendation information output system S includes an electronic musical instrument 30, a portable terminal 50, and a server 70. The electronic musical instrument 30 and the server 70 are configured to be able to communicate, and the portable terminal 50 and the server 70 are configured to be able to communicate.

The electronic musical instrument 30 is a device (electronic apparatus) that produces musical sounds based on the performance of a user H. In the electronic musical instrument 30, tone data having tone information are stored in a tone memory 32*b* to be described afterwards. Tone data corresponding to a tone selected by the user H are read from the tone memory 32*b* and processed in a sound source 38 to be described with reference to FIG. 6, thereby outputting the tone data as musical sounds from a speaker 43 to be described with reference to FIG. 6. In the following, reading tone data for output of musical sounds is referred to as "load". Such "load" is different from the concept of "download", which is solely to obtain data via a network.

The tone data are data including waveform data and multiple tone-related variable values (attack, decay, sustain and release, that is, envelope information, etc.). The electronic musical instrument 30 processes sounds in accordance with the respective variable values set in the tone data selected by the user H, and produces the processed sound. In addition to tone data having been incorporated when the electronic musical instrument 30 is shipped out of the factory, tone data may also be obtained from the server 70. When loading the tone data or editing the volume, the envelope, etc., of the tone data, the electronic musical instrument 30 transmits the fact of loading or editing to the server 70.

The portable terminal 50 is a terminal (information processing device, computer) performing a process in accordance with an instruction input from the user H. The portable terminal 50 is provided with an LCD 56, which is a display device. As will be described in detail in the following, the portable terminal 50 is configured to be able to obtain tone data from the server 70 to the electronic musical instrument 30 according to an instruction from the user H, and is further configured to be able to display on the LCD 56 the recommendation information related to the tone data received from the server 70.

The server 70 is an information processing device (computer) in which multiple tone data utilized in the electronic musical instrument 30 are stored. In addition to the tone data, the server 70 also stores wave data, which is waveform information of sounds utilized in the electronic musical instrument 30 and the portable terminal 50, musical score data, etc. The data which can be utilized in the electronic musical instrument 30 and the portable terminal 50, such as the tone data, stored in the server 70 are generally referred to as "contents".

The usage counts and the usage times of the tone data are stored in the server 70 for each tone data that is stored and each user H of the electronic musical instrument 30 connected to the server 70. In addition, based on the usage count that is stored, the server 70 generates the recommendation information relating to the tone data. Here, the storage of the usage counts, etc., from the electronic musical instrument 30 and the generation of the recommendation information from the usage counts that are stored in the server 70 are described with reference to FIG. 2.

Figure 2:
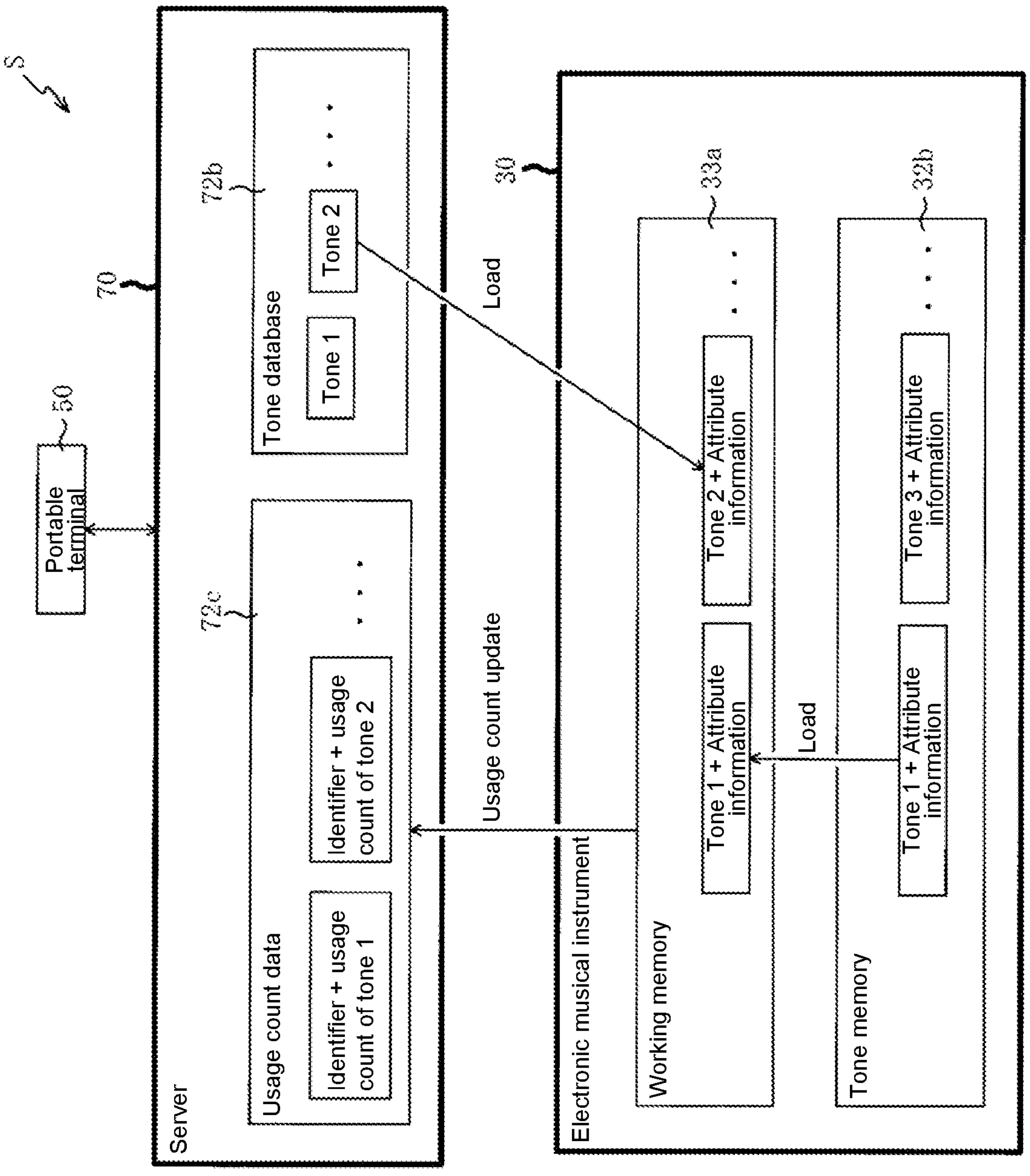
FIG. 2 is a diagram schematically illustrating generation of recommendation information.

FIG. 2 is a diagram schematically illustrating generation of the recommendation information. The server 70 is provided with a tone database 72*b* in which multiple sound data are stored and a usage count data 72*c*. In the usage count data 72*c*, the usage counts and the usage times of the tone data are stored for each tone data and for each user H utilizing the electronic musical instrument 30. In the embodiment, "usage count of tone data" refers to a load count, which is a count for the number of times that the electronic musical instrument 30 loads a tone data, an editing count for the number of times that the tone data is edited in the electronic musical instrument 30. The usage counts and the usage times of the tone data are indexes indicating the usage states of the tone data.

The electronic musical instrument 30 is provided with a working memory 33*a* and a tone memory 32*b*. The work memory 33*a* is a memory or a memory area storing the tone data used in the performance of the current user H and the attribute information of such tone data, and allowing access of the sound source 38 for a sound source process. The working memory 33*a* can store multiple tone data and the attribute information thereof, and the tone data directly reflecting the performance of the user H among these data is referred to as "current data". The user H can select the current data by operating the electronic musical instrument 30. The tone memory 32*b* stores multiple tone data serving as candidates stored in the working memory 33*a* and used in sound production and the attribute information thereof.

Storing the tone data to the working memory 33*a* includes: acquiring the tone data stored in the server 70 and storing the tone data in the working memory 33*a* as well as obtaining the tone data stored in the tone memory 32*b* and storing the tone data in the working memory 33*a*. Storing the tone data to the working memory 33*a* is referred to as "load".

The usage counts and the usage times of the tone data are transmitted to the server 70 from the electronic musical instrument 30. Specifically, when the electronic musical instrument 30 is used, in the case where the tone data is loaded to the working memory 33*a* with the user H selecting the desired tone, the fact that the tone data is loaded is transmitted to the server 70, and in the case where the electronic musical instrument 30 edits the tone data stored in the working memory 330*a* or the tone memory 33*b* with the user H having adjusted the variable values relating to the tone, the fact that the tone data is edited is transmitted. In addition, in the case where the tone data loaded to the working memory 33*a* is changed to another tone data, the time during which the tone data is loaded, that is, the usage time, is transmitted to the server 70.

In the case of receiving the usage count and the usage time from the electronic musical instrument 30, the server 70 stores the usage count and the usage time that are received to the tone data corresponding to the usage count data 72*c* and the area of the user H utilizing the electronic musical instrument 30. Specifically, in the case of receiving the fact that the tone data is loaded, the fact that the tone data is edited, or the usage time of the tone data from the electronic musical instrument 30, the server 70 adds 1 to the usage count of the usage count data 72*c* corresponding to the tone data and the user H utilizing the electronic musical instrument 30, which is the load count or the edit count. In addition, the server 70 adds the received usage time of the tone data to the usage time corresponding to the tone data and the user H utilizing the electronic musical instrument 30 in the usage count data 72*c*.

Such storage of the usage count and the usage time to the usage count data 72*c* is transmitted to multiple electronic musical instruments 30 connected to the sever 70. Since there are one or more users H utilizing the electronic music instruments 30, in the electronic music instruments 30, the usage count and the usage time of each tone data are stored for each user H.

Accordingly, the recommendation information that presents tone data recommending the user H to utilize (i.e., to load) is generated among the tone data stored from the usage counts and the usage times stored in the usage count data 72 of the server 70. Here, the recommendation information refers to the information setting, among the tone data stored in the usage count data 72*c* (tone database 72*b*), tone data-related information (tone identifier, tone name, etc.) recommended to be utilized by a request user requesting to generate such information.

At the time of generating the recommendation information, the server 70 receives a user identifier of the request user, which is the user H as the target of the recommendation information, from the portable terminal 50. Specifically, a user identifier, which is the identifier of the user H utilizing the portable terminal 50, is input in advance to the portable terminal 50, and the user identifier of the user H utilizing the portable terminal 50 is transmitted to the server 70. The user identifier received from the portable terminal 50 is used as the user identifier of the request user in the server 70.

Based on the usage count and the usage time of the request user stored in the usage count data 72*c* and the usage counts and the usage times of the users H other than the request user, the server 70 obtains a similar user, which is a user H similar to the request user.

From the usage count and the usage time of each tone data of the request user and the usage count and the usage time of each tone data of the obtained similar user, the tone data to be registered in the recommendation information are obtained, and the recommendation information is generated based on the obtained tone data. The generated recommendation information is transmitted to the portable terminal 50 and displayed on the LCD 56 of the portable terminal 50. The recommendation information displayed on the LCD 56 displays one or more (such as the three tone data names as shown in FIG. 1) names of the tone data recommended for utilization to the user H.

Accordingly, the recommendation information is generated by the server 70 based on the usage count and the usage time of the request user obtained from the electronic musical instrument 30 and stored in the server 70, the generated recommendation information is transmitted from the server 70 to the portable terminal 50 to be displayed on the LCD 56 of the portable terminal 50. Among the tone data, a tone data with a high usage count and a long usage time is a data repetitively loaded, edited, or utilized for a long time by the user H. Therefore, such tone data is familiar and attached to the user H, and is a tone data conforming to the preference of the user H.

Here, since the electronic musical instrument 30 may also receive tone data from the server 70, it may also be considered to generate the recommendation information based on download counts or purchase counts of the tone data. However, for tone data whose download count or purchase count are equal as one, there may be also a tone data repetitively loaded and edited as well as a tone data hardly loaded or edited in the electronic musical instrument 30. That is, it is difficult to determine whether the tone data conforms to the preference of the request user by using the download count or the purchase count of the tone data.

Therefore, by generating the recommendation information of the request user based on the usage counts and the usage times of the tone data of the request user stored in the usage count data 72*c* of the server 70, the recommendation information can conform to the preference of the request user.

Figure 3:
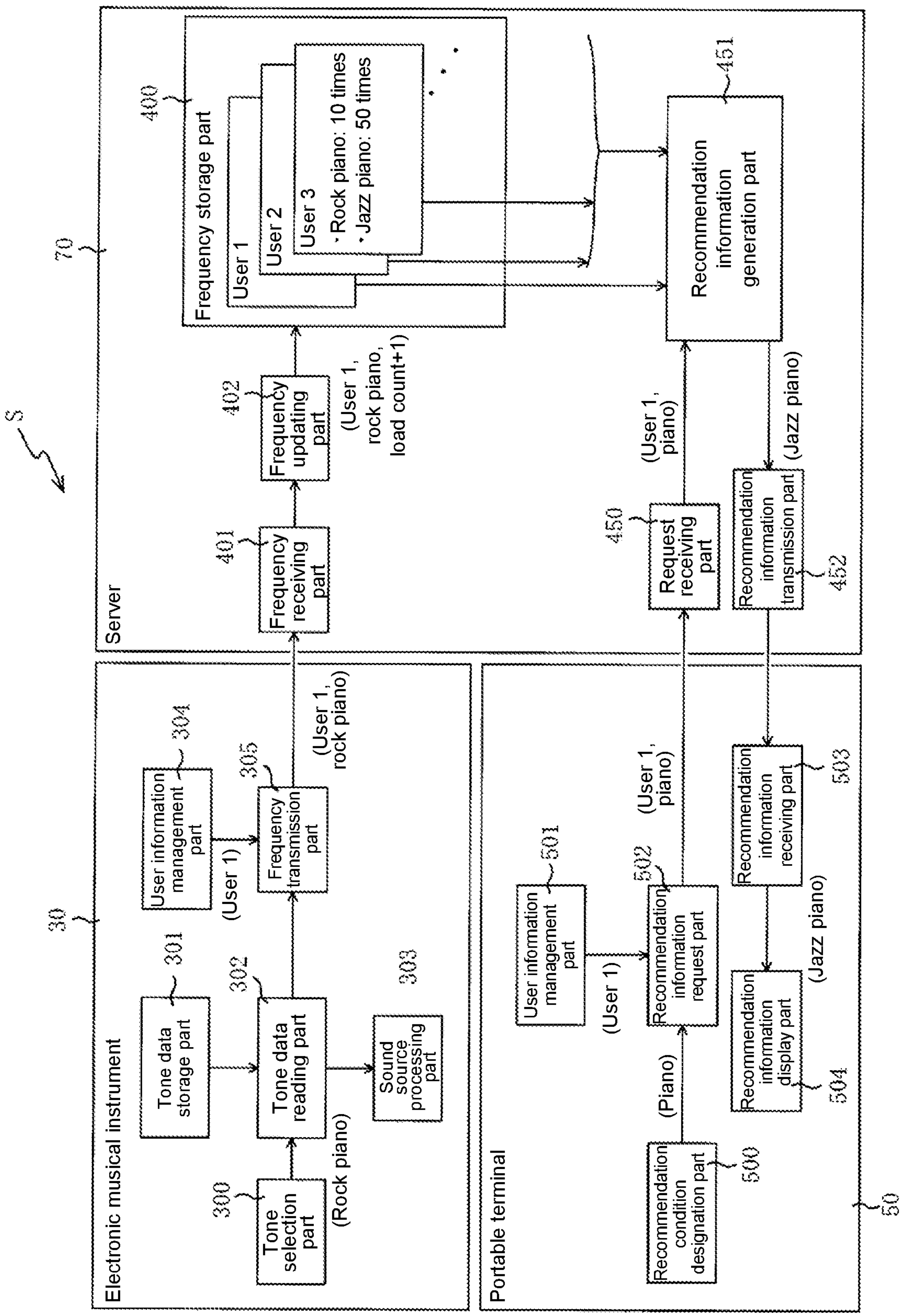
FIG. 3 is a functional block diagram of the recommendation information output system.

In the following, the function of the recommendation information output system S is described with reference to FIG. 3. FIG. 3 is a functional block diagram of the recommendation information output system S. As shown in FIG. 3, the recommendation information output system S includes the electronic musical instrument 30, the server 70, and the portable terminal 50. The electronic musical instrument 30 includes a tone selection part 300, a tone data storage part 301, a tone data reading part 302, a sound source processing part 303, a user information management part 304, and a frequency transmission part 305.

Figure 6:
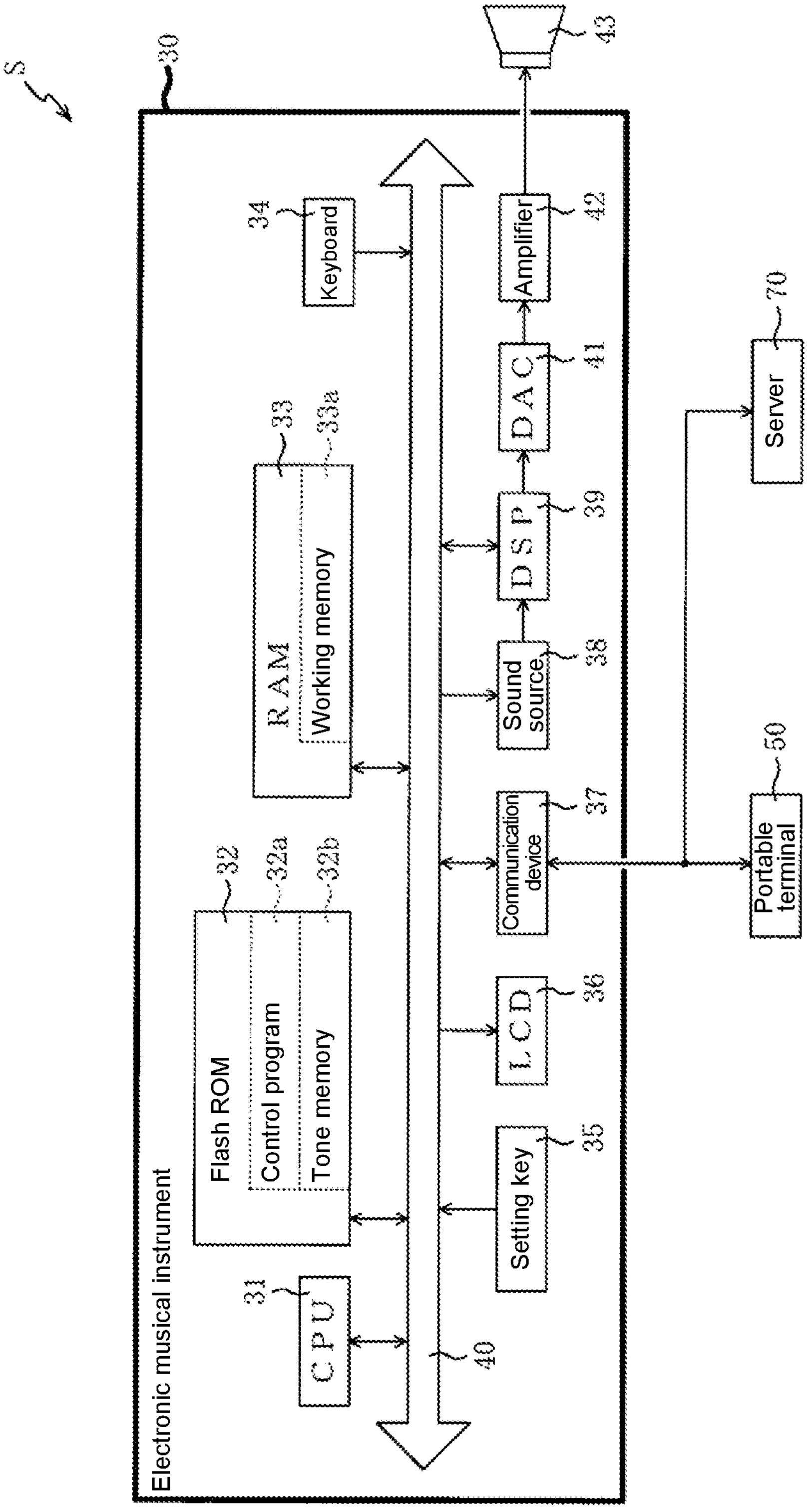
FIG. 6 is a block diagram illustrating an electrical configuration of an electronic musical instrument of the recommendation information output system.

The tone selection part 300 is a part for the user H to select a tone data, and is realized by a setting key 35 and a CPU 31 to be described afterwards with reference to FIG. 6. The tone data storage part 301 is a part storing the tone data, and is realized by the tone memory 32*b* to be described afterwards with reference to FIG. 6. The tone data reading part 302 is a part loading the tone data selected by the tone selection part 300 from the tone data storage part 301, and is realized by the CPU 31. The sound source processing part 303 is a part producing a sound based on the tone data loaded by the tone data reading part 302, and is realized by the sound source 38 and a DSP 39 to be described afterwards with reference to FIG. 6.

The user information management part 304 is a part managing the user identifier which is the identifier of the user H utilizing the electronic musical instrument 30, and is realized by the CPU 31. The frequency transmission part 305 is a means for transmitting the information of the tone data loaded by the tone data reading part 302 and the user identifier managed by the user information management part 304 to the server 70, and is realized by the CPU 31 and a communication device 37 to be described afterwards with reference to FIG. 6.

The server 70 includes a frequency storage part 400, a frequency receiving part 401, a frequency updating part 402, a request receiving part 450, a recommendation information generation part 451, and a recommendation information transmission part 452. The frequency storage part 400 is a part for storing the load count for each tone data and each user H, and is realized by an HDD 72 to be described afterwards with reference to FIG. 4. The frequency receiving part 401 is a part receiving the information of the loaded tone data and the user identifier transmitted from the electronic musical instrument 30, and is realized by a CPU 71 and a communication device 76 to be described afterwards with reference to FIG. 4. The frequency updating part 402 is a part using the information of the loaded tone data and the user identifier received by the frequency receiving part 401 and updating the load count of the frequency storage part 400, and is realized by the CPU 71.

The request receiving part 450 is a part receiving a recommendation information request requesting generation of recommendation information from the portable terminal 50, and is realized by the CPU 71 and the communication device 76. The recommendation information generation part 451 is a part for generating the recommendation information based on the user identifier and a recommendation condition, such as a category (piano, etc.) of the tone data, included in the recommendation information request, and is realized by the CPU 71. The recommendation information generation part 451 obtains a similar user whose load count is similar to the load count of the obtained user identifier. In addition, the recommendation information generation part 451 registers to the recommendation information the tone data in which the load count of the similar user is significantly different from the user H of the obtained user identifier and which conforms to the obtained recommendation condition. The recommendation information transmission part 452 is a part transmitting the recommendation information generated by the recommendation information generation part 451 to the portable terminal 50 whose recommendation information request is received by the request receiving part 450, and is realized by the CPU 71 and the communication device 76.

The portable terminal 50 includes a recommendation condition designation part 500, a user information management part 501, a recommendation information request part 502, a recommendation information receiving part 503, and a recommendation information display part 504. The recommendation condition designation part 500 is a part for the user H to designate the recommendation condition, and is realized by a CPU 51 and a touch panel 57 to be described afterwards with reference to FIG. 4. The user information management part 501 is a part managing the user identifier of the user H utilizing the portable terminal 50, and is realized by the CPU 51. The recommendation information request part 502 is a part transmitting to the server 70 the recommendation information request including the recommendation condition designated by the recommendation condition designation part 500 and the user identifier managed by the user information management part 501, and is realized by the CPU and a communication device 61 to be described afterwards with reference to FIG. 4.

The recommendation information receiving part 503 is a part receiving the recommendation information transmitted from the server 70, and is realized by the CPU 51 and the communication device 61. The recommendation information display part 504 is a part displaying the recommendation information received by the recommendation information receiving part 503, and is realized by the CPU 51 and the display LCD 56.

In the recommendation information output system S, the load count for each user identifier and each tone data obtained from the electronic musical instrument 30 is stored in the server 70. In addition, the server 70 generates the recommendation information based on the load counts of the tone data corresponding to the received user identifier of the portable terminal 50, and displays the recommendation information on the portable terminal 50. Among the tone data, the tone data with a high load count is familiar and attached to the user H, and is a tone data conforming to the preference of the user H. By generating the recommendation information based on the usage count and the usage time of such tone data and displaying the recommendation information on the portable terminal 50, the tone data conforming to the preference of the user H of the portable terminal 50 can be recommended and presented.

Figure 4:
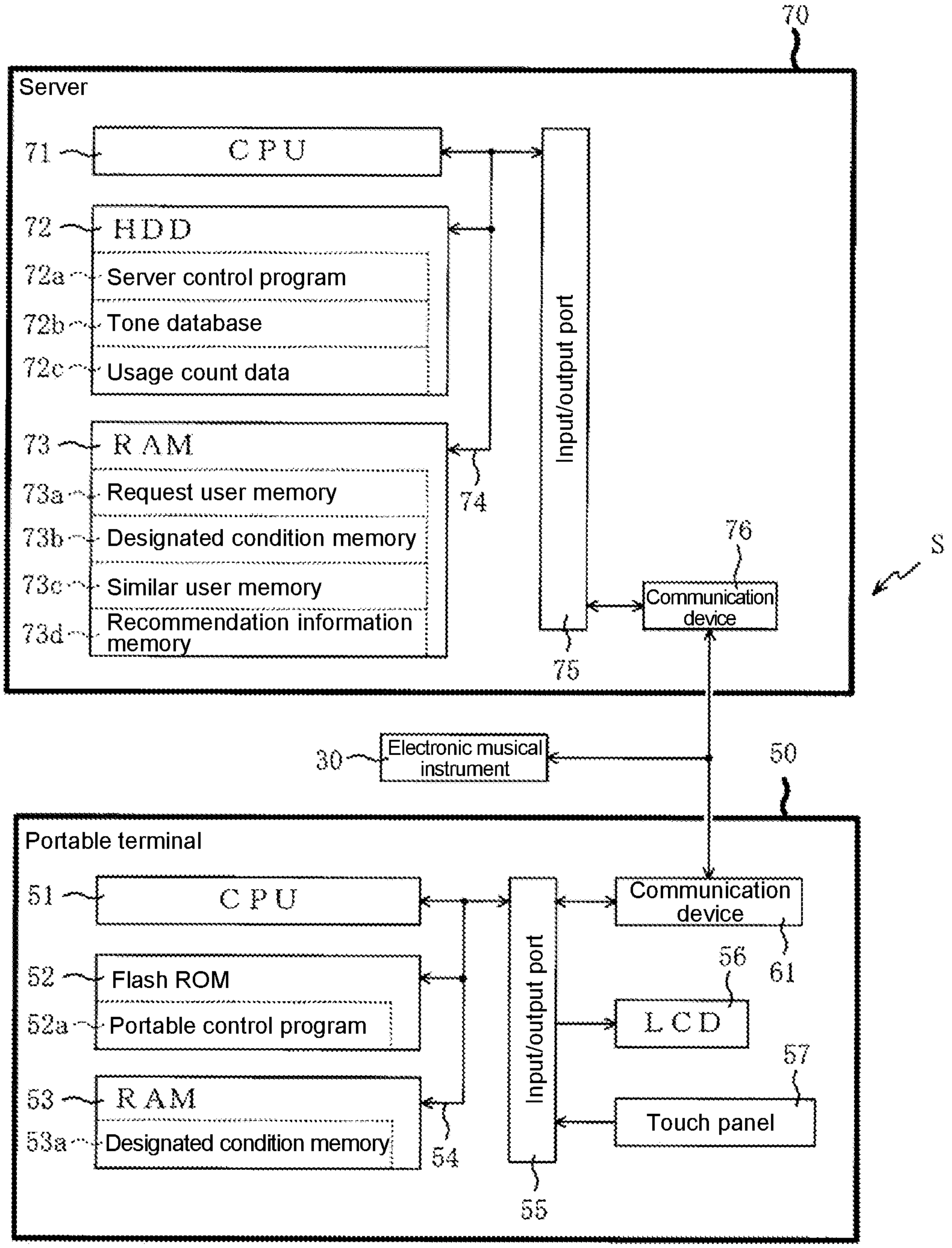
FIG. 4 is a block diagram illustrating an electrical configuration of a server and a portable terminal of the recommendation information output system.

In the following, the electrical configuration of the recommendation information output system S is described with reference to FIGS. 4 to 6. FIG. 4 is a block diagram illustrating an electrical configuration of the server 70 and the portable terminal 50 of the recommendation information output system S. The server 70 includes the CPU 71, the hard disk drive (HDD) 72, and a RAM 73. The CPU 71, the HDD 72, and the RAM 73 are respectively connected to an input/output port 75 via a bus line 74. The input/output port 75 is further connected with a communication device 76 communicating with the electronic musical instrument 30 and the portable terminal 50.

Figure 9:
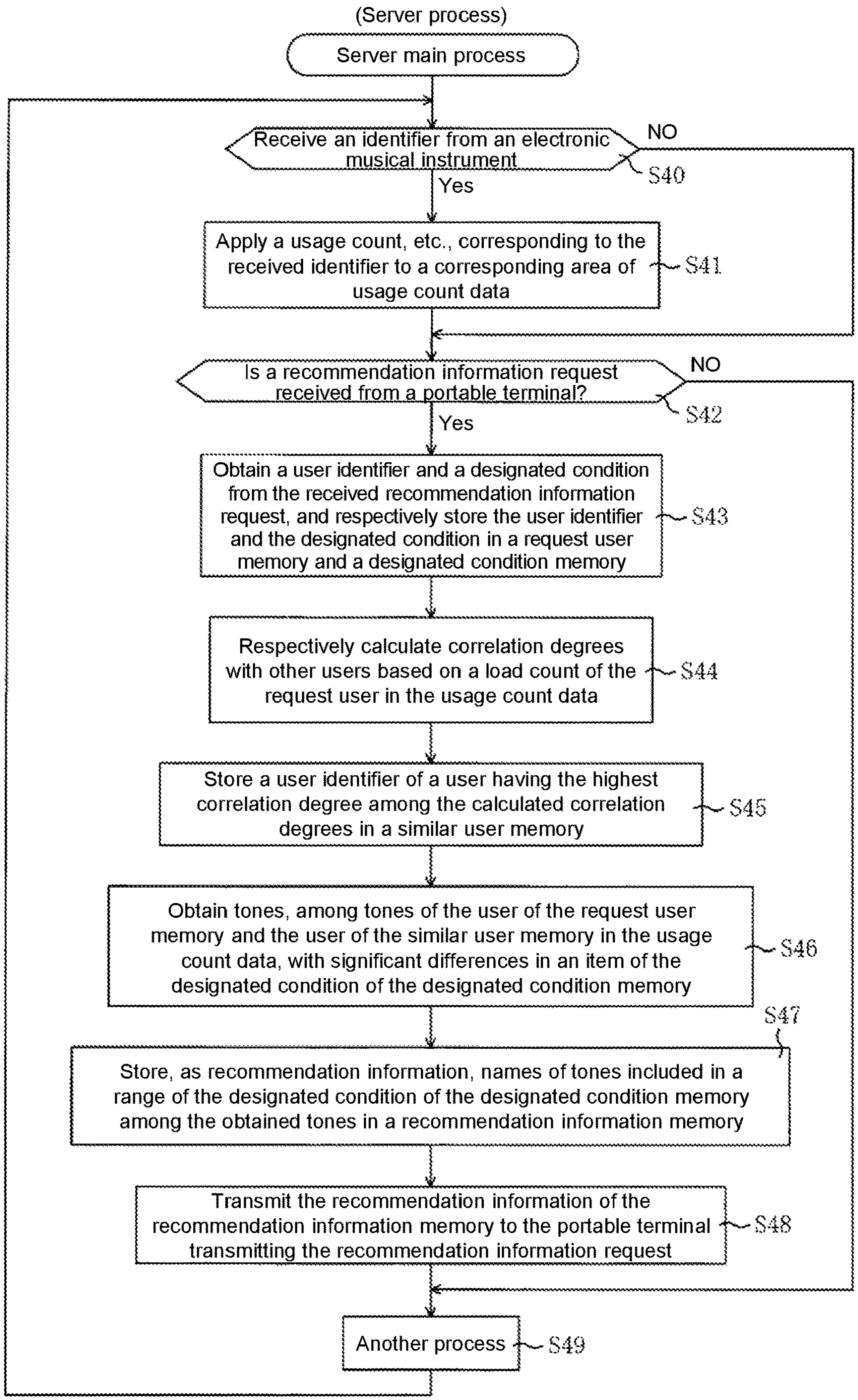
FIG. 9 is a flowchart illustrating a server main process.

The CPU 71 is a computing device controlling the respective parts connected via the bus line 74. The HDD 72 is a rewritable non-volatile storage device storing programs executed by the CPU 71, fixed value data, etc., and includes a server control program 72*a*, the tone database 72*b*, and the usage count data 72*c*. When the server control program 72*a* is executed by the CPU 71, a server main process as shown in FIG. 9 is executed. A specific configuration of the usage count data 72*c* is described with reference to FIG. 5.

FIG. 5 is a diagram schematically showing the usage count data 72*c*. As shown in FIG. 5, the usage count data 72*c* stores, for each tone data, the tone information, the usage count (i.e., load count and edit count), and the usage time of the tone data. The usage count and the usage time stored in the usage count data 72*c* may also be referred to as "usage frequency".

The tone information includes the name, the category, the characteristic, and the envelope of the tone data. As the category of the tone data, the instrument type, such as piano, organ, guitar, etc., is set. As the characteristic of the tone data, a qualitative (sensory) characteristic when the tone data is heard, such as bright, dark, soft, hard, etc., is set.

In the envelope, attack ("A" in the figure), decay ("D" in the figure), sustain ("S" in the figure), and release ("R" in the figure) are set. Among them, the respective durations of attack, decay, and sustain are set. Specifically, values making the durations correspond to (obtained by converting the values into) 128 levels, from 0 to 127, from the minimum time to the maximum time of the duration are stored. In addition, in sustain, volumes are respectively set. Specifically, values making the volumes correspond to (obtained by converting the values into) 128 levels, from 0 to 127, from the minimum volume level to the maximum volume level are stored.

The tone information of the usage count data 72*c* is set in advance by the manufacturer, the creator of the tone data, etc., and the registration of the tone data to the tone database 72*b* and the tone information of the corresponding tone data are stored in the usage count data 72*c*.

In the usage count and the usage time of the usage count data 72*c*, the load count, the edit count, and the usage time are stored for each tone data and for each user H.

Referring to FIG. 4 again, The RAM 73 is a memory rewritably storing various working data, flags, etc., when the CPU 71 executes a program, and includes a request user memory 73*a*, a designated condition memory 73*b*, a similar user memory 73*c*, and a recommendation information memory 73*d*. The request user memory 73*a* stores the request user. The designated condition memory 73*b* stores the designated condition, which is the condition of the tone information, the usage count, and the usage time as shown in FIG. 5 at the time of generating the recommendation information. The similar user memory 73*c* stores the similar user, which is the user H similar to the request user. The recommendation information memory 73*d* stores the recommendation information.

In the following, the electrical configuration of the portable terminal 50 is described. The portable terminal 50 includes the CPU 51, a flash ROM 52, and a RAM 53. The CPU 51, the flash ROM 52, and the RAM 53 are respectively connected to an input/output port 55 via a bus line 54. The input/output port 55 is further connected with the communication device 61 communicating with the server 70 and the electronic musical instrument 30, the LCD 56, and the touch panel 57 to which the instruction from the user H is input.

Figure 8:
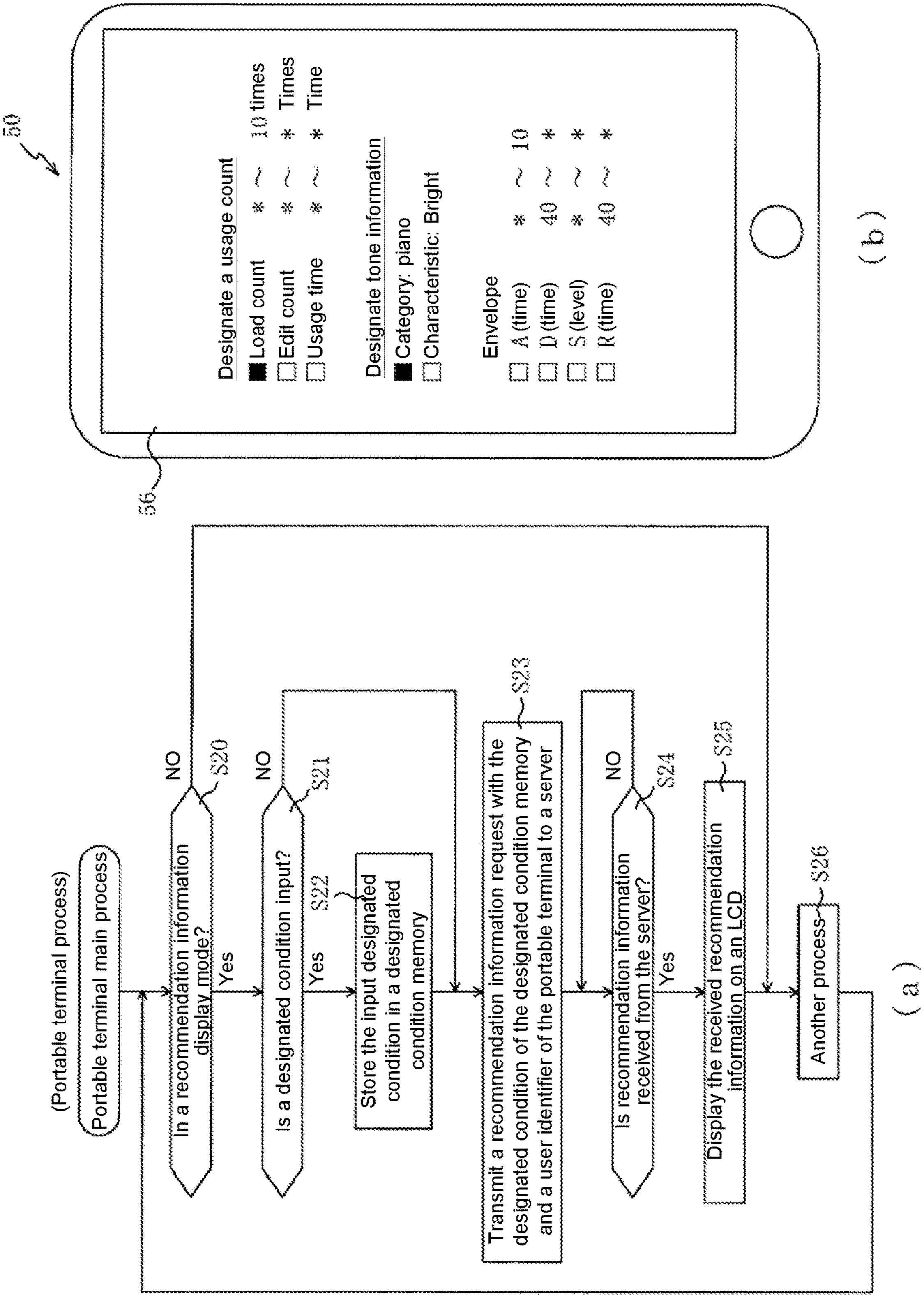
In FIG. 8, (a) is a flowchart illustrating a portable terminal main process, and (b) is a diagram illustrating an input screen displayed on an LCD of the portable terminal when a designated condition is input.

The CPU 51 is a computing device controlling the respective parts connected via the bus line 54. The flash ROM 52 is a rewritable non-volatile storage device storing programs executed by the CPU 51 and fixed value data, etc., and stores a portable control program 52*a*. When the portable control program 52*a* is executed by the CPU 51, a portable terminal main process shown in (a) of FIG. 8 is executed. The RAM 53 is a memory rewritably storing various working data, flags, etc., when the CPU 51 executes a program, and includes a designated condition memory 53*a* storing the designated condition.

In the following, the electrical configuration of the electronic musical instrument 30 is described with reference to FIG. 6. FIG. 6 is a block diagram illustrating an electrical configuration of the electronic musical instrument 30 of the recommendation information output system. The electronic musical instrument 30 includes the CPU 31, a flash ROM 32, a RAM 33, a keyboard 34 for obtaining the performance information generated in the performance of the user H, the setting key 35 with which the user H inputs various settings, an LCD 36 displaying the setting state, etc., of the electronic musical instrument 30, the communication device 37 communicating with the server 70 and the portable terminal 50, the sound source 38, and the digital signal processor (DSP) 39, and these components are respectively connected via a bus line 40.

Figure 7:
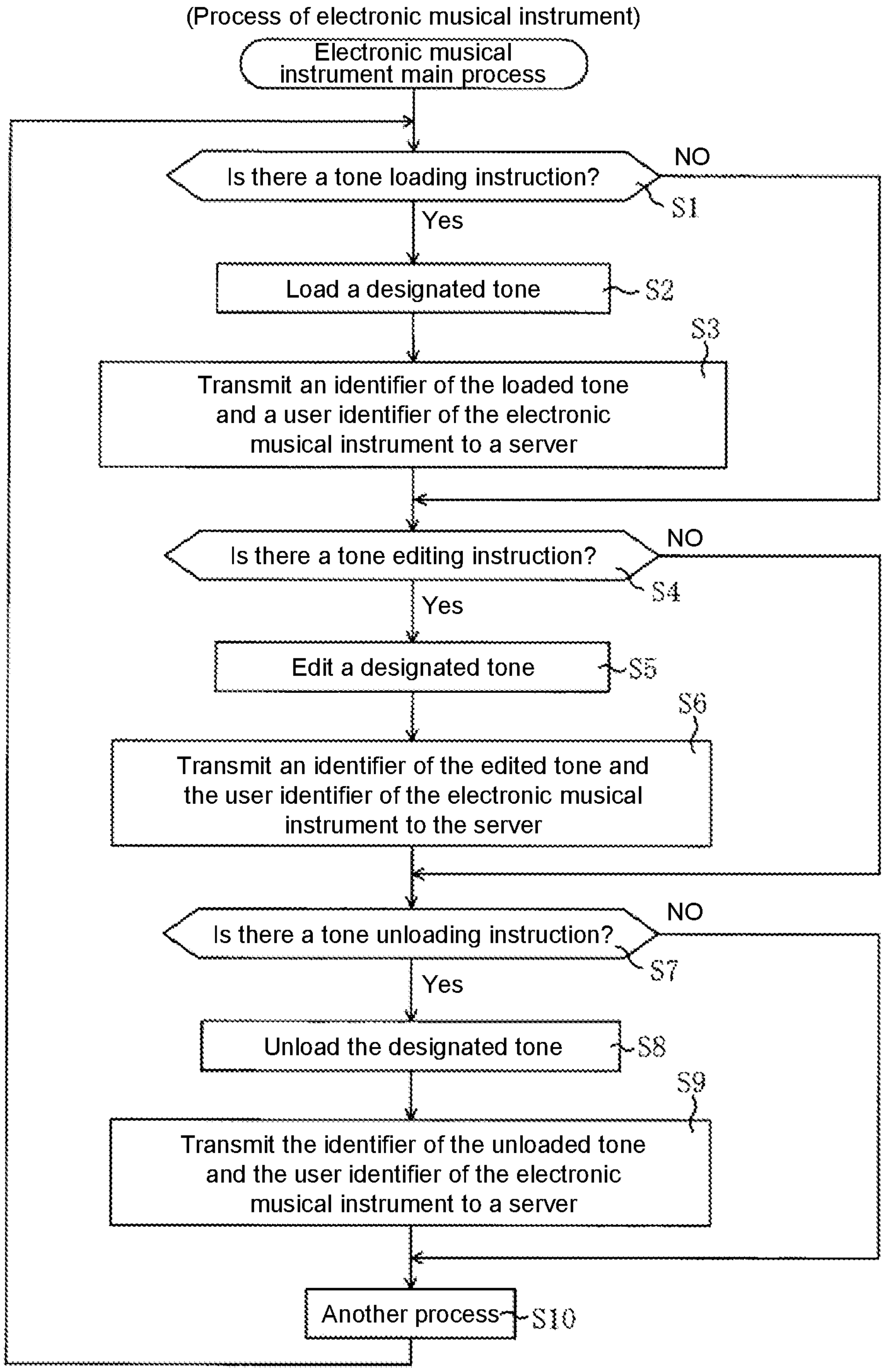
FIG. 7 is a flowchart of a main process of the electronic musical instrument.

The CPU 31 is a computing device controlling the respective parts connected via the bus line 40. The flash ROM 32 is a rewritable non-volatile storage device storing programs executed by the CPU 31 and fixed value data, etc., and includes a control program 32*a* and the tone memory 32*b*. When the control program 32*a* is executed by the CPU 31, an electronic musical instrument main process as shown in FIG. 7 is executed. The RAM 33 is a memory rewritably storing various working data, flags, etc., when the CPU 31 executes a program, and includes the working memory 33*a*.

The sound source 38 is a processing part executing a sound source process based on the current tone data of the working memory 33*a* in accordance with the performance information input from the keyboard 34. The DSP 39 is a computing process part for computing the waveform data input from the sound source 38. The sound source 38 and a digital-analog converter (DAC) 41 are connected to the DSP 39, an amplifier 42 is connected to the DAC 41, and a speaker 43 is connected to the amplifier 42.

In the following, the processes executed by the CPU 31 of the electronic musical instrument 30, the CPU 51 of the portable terminal 50, and the CPU of the server 70 are described with reference to FIGS. 7 to 9. Firstly, the process of the electronic musical instrument 30 is described with reference to FIG. 7.

FIG. 7 is a flowchart of the electronic musical instrument main process. The electronic musical instrument main process is a loop process started and executed when the power of the communication device 37 is turned on. In the electronic musical instrument main process, firstly, whether a load instruction for loading the tone data to the working memory 33*a* is obtained is verified (S1). In addition to the instruction for loading the tone data of the tone memory 32*b* via the setting key 35 of the electronic musical instrument 30, the load instruction also includes an instruction for loading the tone data stored in the tone database 72*b* of the server 70 from the server 70.

In the process of S1, in the case where the load instruction is obtained (S1: Yes), the tone data corresponding to the load instruction obtained in the process of S1 is loaded (S2). After the process of S2, the tone identifier of the loaded tone data and the user identifier utilizing the electronic musical instrument 30 are transmitted to the server 70 (S3). In the case where there are multiple loaded tone data in the process of S2, the respective tone data are transmitted through the process of S3.

In the process of S1, in the case where the load instruction is not obtained (S1: No), the processes of S2 and S3 are skipped.

After the processes of S1 and S3, whether an edit instruction editing the tone data is obtained is verified (S4). In addition to the instruction for editing the tone data stored in the working memory 33*a*, the edit instruction also includes an instruction for editing the tone data stored in the tone memory 32*b* (see FIG. 6) of the electronic musical instrument 30.

In the process of S4, in the case where the edit instruction is obtained (S4: Yes), the tone data is edited in correspondence with the edit instruction (S5). After the process of S5, the tone identifier of the edited tone data and the user identifier of the electronic musical instrument 30 are transmitted to the server 70 (S6). Meanwhile, in the process of S4, in the case where the edit instruction is not obtained (S4: No), the processes of S5 and S6 are skipped.

After the processes of S4 and S6, whether an unload instruction for unloading the tone data from the working memory 33*a* is obtained is verified (S7). In the process of S7, in the case where the unload instruction is obtained (S7: Yes), the tone data corresponding to the unload instruction is unloaded (S8). After the process of S8, the tone identifier of the unloaded tone data and the user identifier of the electronic musical instrument 30 are transmitted to the server 70 (S9). Meanwhile, in the process of S7, in the case where the unload instruction is not obtained (S7: No), the processes of S8 and S9 are skipped. The case where the unload instruction is obtained refers to that, with another tone data being loaded, the tone data having been loaded so far is unloaded, or the power of the electronic musical instrument 30 is turned off.

After the processes of S7 and S9, another process of the electronic musical instrument 30 (e.g., verifying whether the performance information is input from the user H via the keyboard 34, or an updating process for display on the LCD 36) is executed (S10), and the processes since S1 are repeated.

Then, the process of the portable terminal 50 is described with reference to (a) and (b) of FIG. 8. (a) of FIG. 8 is a flowchart illustrating a portable terminal main process. The portable terminal main process is a loop process executed in the case where an application program for the recommendation information output system S included in the portable control program 52*a* (see FIG. 4) is started.

In the portable terminal main process, firstly, whether a recommendation information display mode is set in the portable terminal 50 is verified (S20). The recommendation information display mode is an operation mode displaying the recommendation information. In the process of S20, in the case where the recommendation information display mode is set (S20: Yes), whether the designated condition is input is verified (S21). The designated condition refers to a condition according to the tone information, the usage count, and the usage time used when the server 70 generates the recommendation information. Then, referring to (b) of FIG. 8, the input of the designated condition is described.

In FIG. 8, (b) is a diagram illustrating an input screen displayed on the LCD 56 of the portable terminal 50 when the designated condition is input. In the process of S21, in the case where the user H inputs the designated condition, the input screen shown in (b) of FIG. 8 is displayed on the LCD 56. In the input screen, the user H sets via the touch panel 57 the ranges and the types of the usage count, the usage time, and the tone information of the tone data as the target of the recommendation information.

Specifically, the designated condition is configured to be able to designate, for the usage count, the lower limits and the upper limits of the load count and the edit count of the tone data as the target of the recommendation information, and is configured to be able to designate the lower time limit and the upper time limit of the usage time. Regarding the designated usage count, instead of a value of the usage count itself, the designated usage count may also be obtained by converting the range from the lower limit of the usage count to the upper limit into multiple levels (e.g., five levels), and designate the level. In addition, in the designation of the lower limit and the upper limit and the lower time limit and the upper time limit, the symbol "*" representing a wild card is designated when the user intends to designate an arbitrary value or time. For example, in the load count in (b) of FIG. 8, since the lower limit is designated as "*", and the upper limit is designated as "10 times", a tone data whose load count is equal to or less than 10 is set as the target of the recommendation information generated by the server 70.

Meanwhile, as the tone information, it is possible to designate the types of the category and the characteristic of the tone data as the target of the recommendation information as well as the respective values of attack ("A" in the figure), decay ("D" in the figure), sustain ("S" in the figure) and release ("R" in the figure) of the envelope. Regarding the designation of the respective values of the envelope, like the designation of the usage count, etc., it is possible to designate a wild card.

In the embodiment, it is possible to designate any of the load count, the edit count, and the usage time, and it is possible to designate any of the category, the characteristic, and the envelope of the tone information. In FIG. 8, (b) illustrates the case where, in the usage count designation, only "load count" is selected to be enabled, and, in the tone information designation, the designation of piano is enabled, whereas the designation of the envelope is not enabled. It is possible to designate multiple conditions as the usage count designation and the tone information designation. In the case where multiple conditions are designated, the AND condition of the respective conditions is set as the designated condition. However, in the case where multiple conditions are designated, it is also possible to designate the OR condition of the respective conditions as the designated condition.

In addition, it may be that more than one of the load count, the edit count, the usage time, and the tone information are designated, and it may also be that one of the load count, the edit count, the usage time, and the tone information is designated. Accordingly, the conditions of the load count, the edit count, the usage time, and the tone information designated in the input screen is designated as the designated condition.

Referring to (a) of FIG. 8 again, in the process of S21, in the case where the designated condition is input (S21: Yes), the designated condition input in the input screen shown in (b) of FIG. 8 is stored in the designated condition memory 73*b*. Meanwhile, in the process of S21, in the case where the designated condition is not input (S21: No), the process of S22 is skipped.

After the processes of S21 and S22, the recommendation information request is generated and transmitted to the server 70 (S23). The recommendation information request is a request including the designated condition stored in the designated condition memory 73*b* and the user identifier of the user utilizing the portable terminal 50, and is a request that requests the recommendation information.

After the process of S23, whether the recommendation information corresponding to the transmitted recommendation information request is received from the server 70 is verified (S24). In the process of S24, in the case where the recommendation information is not received from the server 70 (S24: No), the process of S24 is repeated. Meanwhile, in the process of S24, in the case where the recommendation information is received from the server 70 (S24: Yes), the received recommendation information is displayed on the LCD 56 (S25).

Meanwhile, in the process of S20, in the case where the recommendation information display mode is not set (S20: No), the processes of S21 to S25 are skipped. After the processes of S20 and S25, another process of the portable terminal 50 (e.g., verifying whether the user H makes an input via the touch panel 57, or an updating process for display on the LCD 56, etc.) is executed (S26), and the processes since S20 are repeated.

Then, the process of the server 70 is described with reference to FIG. 9. FIG. 9 is a flowchart illustrating a server main process. The server main process is a loop process started and executed when the power of the server 70 is turned on.

In the server main process, firstly, whether the tone identifier and the user identifier are received from the electronic musical instrument 30 is verified (S40). In the process of S40, in the case where the tone identifier and the user identifier are received from the electronic musical instrument 30 (S40: Yes), the usage count and the usage time corresponding to the received tone identifier and user identifier are stored in the usage count data 72*c* (S41). Specifically, in the case where the tone identifier and the user identifier are received when the electronic musical instrument 30 loads the tone data, the usage count of the tone data corresponding to the received tone identifier as well as the usage count of the user H corresponding to the received user identifier in the usage count data 72*c* are added by 1.

In the case where the tone identifier and the user identifier are received when the electronic musical instrument 30 edits the tone data, the edit counts of the tone data and the user H corresponding to the usage count data 72*c* are added by 1. In addition, in the case where the tone identifier and the user identifier are received when the electronic musical instrument 30 unloads the tone data, the time from loading of the data until unloading of the data is calculated, and the time is added to the usage times of the corresponding tone data and user H in the usage time count data 72*c*.

Meanwhile, in the process of S40, in the case where the usage count is not received from the electronic musical instrument 30 (S40: No), the process of S41 is skipped.

After the processes of S40 and S41, whether the recommendation information request is received from the portable terminal 50 is verified (S42). In the process of S42, in the case where the recommendation information request is received from the portable terminal 50 (S42: Yes), the user identifier and the designated condition included in the received recommendation information request are obtained and respectively stored in the user memory 73*a* and the designated condition memory 73*b* (S43).

After the process of S43, a correlation degree T between the load count of each tone data of the request user of the request user memory 73*a* in the usage count data 72*c* and the load count of each tone data of other users H (hereinafter "other users H") other than the request user of the request user memory 73*a* in the usage count data 72*c* is respectively calculated.

Here, in the case where the load counts of the respective tone data of the request user are set as A1, A2, . . . , An (e.g., the load count of rock piano of the request user is set as A1, the load count of jazz piano of the request user is set as A2, etc.), and the load counts of the respective tone data of the other users H are set as B1, B2, . . . , Bn (e.g., the load count of rock piano of the similar user is set as B1, the load count of jazz piano of the similar user is set as B2, etc.), the correlation degrees T are calculated by using cosine similarity of Formula 1 in the following:

[Formula 1]

$$T = \frac{A_1B_1 + A_2B_2 + \dots + A_nB_n}{\sqrt{A_1^2 + A_2^2 + \dots + A_n^2}\sqrt{B_1^2 + B_2^2 + \dots + B_n^2}} \quad \text{Formula 1}$$

For example, in FIG. 5, in the case where the request user is user 1 and the similar user is user 2, the load count of rock piano of user 1 is set as "100" for A1, and the load count of jazz piano of user 1 is set as "5" for A2, and the load counts of concert piano and subsequent ones of user 1 are respectively set for A3 and subsequent identifiers. Similarly, the load count of rock piano of user 2 is set as "100" for B1, and the load count of jazz piano of the 2 is set as "0" for B2, and the load counts of concert piano and subsequent ones of user 2 are respectively set for B3 and subsequent identifiers. In the process of S44, such correlation degrees T relating to the load counts of the request user and the other users H are calculated for all the other users H stored in the usage count data 72*c*.

After the process of S44, among the correlation degrees T calculated in the process of S44, the user H with the highest correlation degree T is obtained and stored in the similar user memory 73*c* (S45). The correlation degree is an index taking a value from 0 to 1, and it is set that the closer the correlation degree T to 1, the more similar to the load counts of the respective tone data of the request user. Accordingly, through the process of S45, the user H with the highest correlation degree T is stored in the similar user memory 73*c*, and is set as the similar user with the closest preference to the request user.

After the process of S45, among the tone data between the request user and the similar user in the usage count data 72*c*, tone data with significant differences in items such as the tone information, the usage count, etc., designated in the designated condition of the designated condition memory 73*b* are obtained (S46). Specifically, for each tone data in the usage count data 72*c*, the values of the items, such as the tone information, the usage count, etc., of the request user and the similar user designated in the designated condition of the designated condition memory 73*b* are obtained, and the differences therebetween are respectively calculated. For example, in the case where the designated condition is the load count, the request user is user 1, and the similar user is user 2, the difference in load count for rock piano is "0", and the difference in load count for jazz piano is "5". Other designated conditions such as the edit count and the usage time are calculated like the load count.

Moreover, by adding the designated condition of the tone information, such as the category, the characteristic, and the envelope, to the designated condition such as the load count, etc., the obtained tone data can be narrowed down.

At this time, when the item designated in the designated condition of the designated condition memory 73*b* is an item not expressed in values, such as a category, a characteristic, etc., in the case where the request user conforms to the similar user, "0" may be used, and in the case where the request user does not conform to the similar user "10" may be used, and a characteristic of a tendency such as "bright", "slightly bright", etc., is set as 5. Accordingly, a value in accordance with the matching degree of a category or a characteristic between the request user and the similar user may also be expressed as "difference".

In addition, referring to the difference of each calculated tone data, a tone data in which the similar user differs from the request user in a difference of 10 or more is obtained as the tone data with a significant difference. The difference threshold for determining a tone data having a significant difference is not limited to 10, and may also be 10 or more or 10 or less. The difference threshold for determining a tone data with a significant difference may also be changed in accordance with each item designated in the designated condition of the designated condition memory 73*b*. For example, in the case where the designated item is load count, the difference threshold is "10", and the difference threshold is "5" in the case of edit count, and the difference threshold is "15" in the case of attack of the envelope, etc.

At the time of calculating the differences in the process of S46, it may also be that only the tone data in which the last used date of the similar user falls within a predetermined date is used as the tone data for calculating the difference. For example, by using the tone data used by the similar use within a month from, as the reference, the date on which the recommendation information request date is received according to the process of S42 as the tone data for calculating the difference, it can be expected that a result more conforming to the current preference can be obtained.

After the process of S46, among the tone data obtained in the process of S46, the tone data included in the range designated in the designated condition of the designated condition memory 73*b* are obtained, and the specific information of the tone data, such as names and tone identifiers, etc., of the obtained tone data is set as the recommendation information and stored in the recommendation information memory 73*d* (S47). Specifically, the values of the items designated in the designated condition of the designated condition memory 73*b* and in the tone data of the similar user obtained in the process of S46 are respectively obtained. The tone data whose obtained values are included in the range designated in the designated condition of the designated condition memory 73*b* are obtained, and the names of the obtained tone data are set as the recommendation information and stored in the recommendation information memory 73*d*.

After the process of S47, the recommendation information stored in the recommendation information memory 73*d* is transmitted to the portable terminal 50 transmitting the recommendation information request in the process of S42.

In the process of S42, in the case where the recommendation information request is not received from the portable terminal 50 (S42: No), the processes of S43 to S48 are skipped. After the processes of S42 and S48, another process of the server 70 (e.g., a responding process with respect to the request from the electronic musical instrument 30 or the portable terminal 50, etc.) is executed (S49) and the processes since S40 are repeated.

The recommendation information with respect to the request user designated from the portable terminal 50 is generated in the server 70 and transmitted to the portable terminal 50. At this time, the similar user similar to the request user is obtained from the load count, and the recommendation information is generated based on the obtained usage count and tone information of the similar user and the request user in the usage count data 72*c*.

The similar user is a user H whose load count is similar to the request user. In other words, the similar user is a user H loading tone data of a similar tendency and having a similar preference with the request user. By generating the recommendation information based on such usage count, etc., and the tone information of the similar user, the recommendation information more conforming to the preference of the request user can be provided.

In addition, at the time of generating the recommendation information, the item of the designated condition transmitted from the portable terminal 50 is considered. For example, by designating the category "piano" of the tone information as the item of the designated condition, the tone data categorized as piano among the tone data stored in the usage count data 72*c* (i.e., the tone database 72*b*) can be set as the recommendation information.

In addition, by designating "load count" of the usage count as the item of the designated condition, a tone data with a significant difference in load count between the similar user and the request user, that is, a tone data frequently loaded by the similar user but having a low load count for the request user, is set as the recommendation information. Such tone data is a tone data frequently loaded by the similar user, but is an "unknown" tone data with a low load count for the request user. That is, such tone data is a tone data of a tone that should essentially conform to the preference but has not been used much so far for the reason that the request user is unfamiliar therewith, that is, due to so-called "prejudice".

By including such tone data in the recommendation information, the request user can be notified of the presence of the tone data that is unknown while conforming to the preference of the request user. Therefore, the request user can make sufficient use of the many tone data included in the tone database 72*b* or the tone memory 32*b* of the electronic musical instrument 30. Accordingly, the recommendation information output from the server 70 can be helpful to the request user.

Furthermore, it is configured to be able to designate a range of possible values with respect to the item of the designated condition. The range of the values is applied to the tone information and the usage count of the similar user at the time of generating the recommendation information. Accordingly, among the tone data conforming to the item of the designated condition, the tone data serving as the recommendation information can be selected in detail in accordance with the intention and preference of the request user.

Although the above description has been made based on the above embodiment, it can be easily inferred that various improvements and changes are possible.

In the above embodiment, the load count, the edit count, and the usage time are provided as the indexes representing the usage state of the tone data. However, the invention is not limited thereto. Any of the load count, the edit count, and the usage time may be omitted, and another index other than the load count, the edit count, and the usage duration may also be used for representing the usage state of the tone data of the user H.

In the above embodiment, the usage time of the tone data of the electronic musical instrument 30 is calculated in the server 70. However, the invention is not limited thereto. For example, the time from loading of the tone data to unloading of the tone data may also be measured in the electronic musical instrument 30 as the usage time to be transmitted to the server 70.

In the above embodiment, obtaining the similar user according to the processes of S44 and S45 of the server main process of FIG. 9 is performed in the case where the recommendation information request is received from the portable terminal 50 in the process of S42. However, the invention is not limited thereto. Instead of performing every time when receiving the recommendation information request in the process of S42, obtaining the similar user according to the processes of S44 and S45 may also be preformed at a predetermined time (e.g., performed every other day). Accordingly, since obtaining the similar user when the recommendation information request is received according to the process of S42 can be omitted, the generation and transmission of the recommendation information of S46 to S48 can be quickly performed. In addition, obtaining the similar user according to the processes of S44 and S45 may be performed in the case where the server 70 transmits the load instruction to the electronic musical instrument 30, and may also be performed at other timings.

In the above embodiment, the correlation degree T is calculated by using the cosine similarity of Formula 1 in the process of S45 of FIG. 9. However, the invention is not limited thereto. For example, the correlation degree may also be calculated by using Euclidean distance, alternate least squares (ALS), etc.

In addition, the correlation degree T is calculated based on the load count. However, the invention is not limited thereto. The correlation degree T may also be calculated based on the load count or the usage time. In addition, the correlation degree may also be calculated based on a combination of two or more of the load count, the edit count, and the usage time. Similarly, the correlation degree T may also be calculated based on the tone information (category, characteristic, and envelope) of the tone data.

In the embodiment, the load count is calculated from the tone identifier and the user identifier in the loading, editing, and unloading received from the electronic musical instrument 30 through the processes of S40 and S41 of the server 70 of FIG. 9. However, the invention is not limited thereto. For example, it may also be that the load count, etc., is calculated in the electronic musical instrument 30, and the calculated load count, etc., is transmitted to the server 70.

In the above embodiment, in the processes of S3, S6, and S9 of FIG. 7, in the case of being loaded, the fact of being loaded, etc., the tone identifier, and the user identifier are constantly transmitted as a set. However, the invention is not limited thereto. For example, it may also be that, in the case where the tone data is loaded in the electronic musical instrument 30, the fact of being loaded and the tone identifier of the tone data are transmitted from the electronic musical instrument 30, and the server 70 adds 1 to the load count of the received tone data of the user H that was last loaded, etc., before this in the usage count data 72*c*.

In addition, in the case where the tone data is unloaded in the electronic musical instrument 30, only the fact of being unloaded is transmitted from the electronic musical instrument 30. The server 70 may also add 1 to the unload counts of the user H and the tone data which was last unloaded before this in the usage count data 72*c*. Meanwhile, it may also be that the time from loading is added to the usage times of the user H and the tone data of the usage count data 72*c*.

Moreover, although the fact of being loaded, the tone identifier, and the user identifier are transmitted every time when the tone data is loaded, etc., in the electronic musical instrument, the invention is not limited thereto. For example, it may also be that the load count, the variable count, and the usage time can accumulate for each tone data in the electronic musical instrument 30, and in each predetermined period (e.g., in every three hours), the load count, the variable count, and the usage time accumulating during this period are transmitted to the server 70. Alternatively, it may also be that the load count, the variable count, and the usage time after the power of the electronic musical instrument 30 is turned on until the power is turned off are transmitted to the server 70 when the power is turned off. In such cases, in the server 70, the transmitted load count, variable count, and usage time may be respectively added to the load counts, the variable counts, and the usage times of the corresponding user H and tone data in the usage count data 72*c*.

In the above embodiment, the differences in the tone information, the usage count, etc., of the tone data between the request user and the similar user is calculated in the process of S46 of FIG. 9 and the tone data set as the recommendation information is obtained based on the calculated differences. However, the invention is not limited thereto. It may also be that a ratio on the tone information, the usage count, etc., of the tone data between the request user and the similar user is calculated, and the tone set as the recommendation information is obtained based on the calculated ratio.

Moreover, in the process of S46 of FIG. 9, the tone data in which the load count, etc., of the similar user is greater than the load count, etc., of the request user is set as the recommendation information. However, the invention is not limited thereto. It may also be that the tone data in which the load count, etc., of the request user is greater than the load count, etc., of the similar user is set as the recommendation information.

Figure 10:
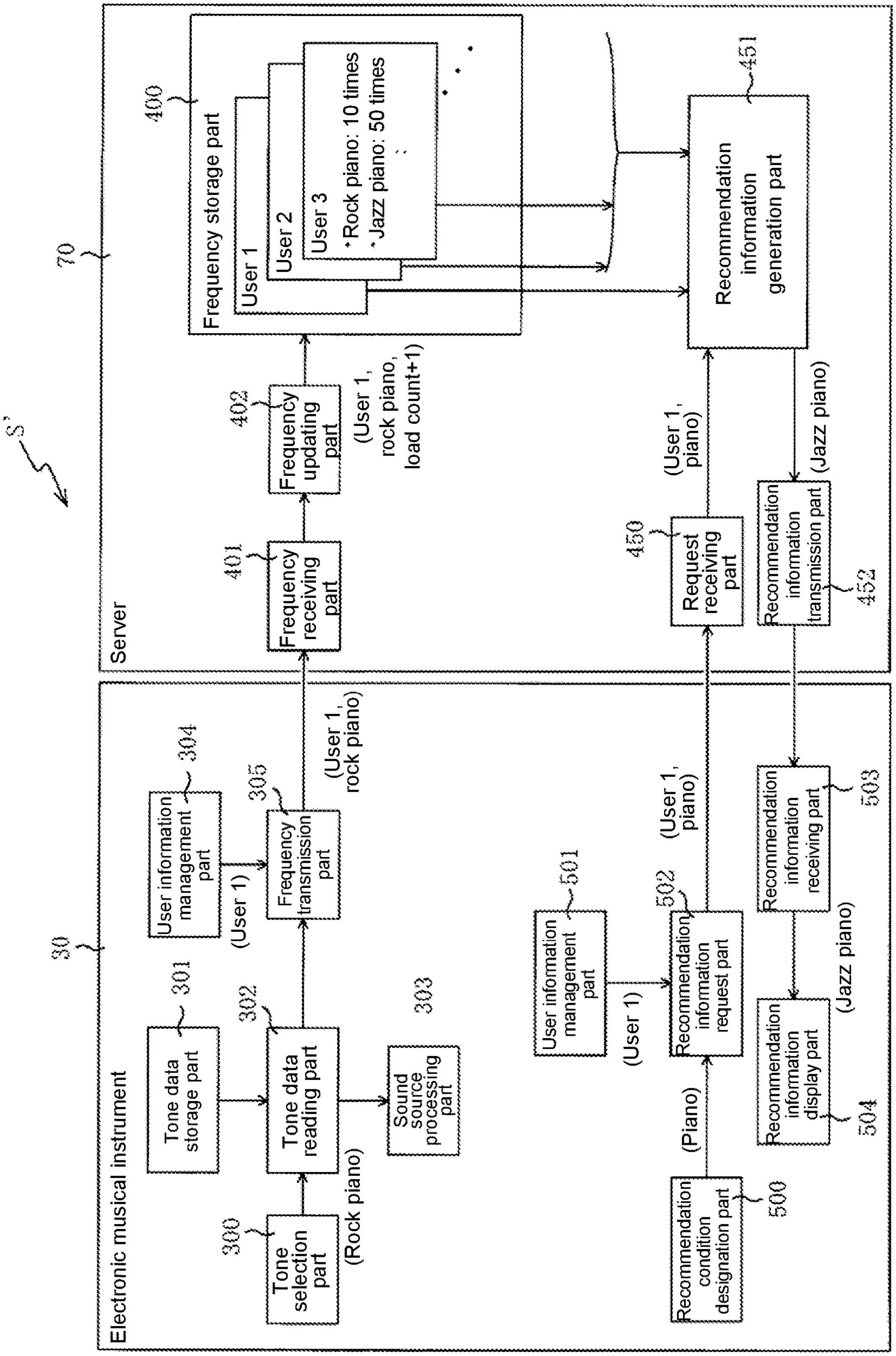
FIG. 10 is a functional block diagram illustrating a recommendation information output system according to a modified example.

In the above embodiment, the recommendation information request and the display of the recommendation information generated by the server 70 are performed by the portable terminal. However, the invention is not limited thereto. For example, the recommendation information request and the display of the recommendation information generated by the server 70 may also be performed by the electronic musical instrument 30. In this case, as shown in a recommendation information output system S' of FIG. 10, the portable terminal 50 is omitted from the recommendation information output system S shown in FIG. 3. In place thereof, the recommendation condition designation part 500, the user information management part 501, the recommendation information request part 502, the recommendation information receiving part 503, and the recommendation information display part 504 executed by the portable terminal 50 may also be executed by the electronic musical instrument 30.

In addition, it may also be that the recommendation information request is performed by the portable terminal 50, and the recommendation information generated by the server 70 is transmitted to the electronic musical instrument 30 utilized by the user H with the user identifier included in the recommendation information request from the portable terminal 50, and the received recommendation information is displayed on the LCD 36 of the electronic musical instrument 30. In addition, the recommendation information generated by the server 70 may also be displayed on a display device (not shown) connected to the server 70, and may also be printed on paper by using a printer (not shown) connected to the server 70.

In the above embodiment, the portable terminal 50 is exemplified as a terminal to which the recommendation information request is input from the user H and on which the recommendation information is displayed. However, the invention is not limited thereto. For example, a personal computer, a tablet terminal, etc., may also serve as the terminal to which the instruction from the user H is input.

In the above embodiment, the electronic musical instrument 30 is exemplified as an electronic apparatus. However, the invention is not limited thereto. For example, the electronic apparatus may also be a video device for video processing. At this time, in the server 70, video data, voice data, and data relating to editing such as scene switching, etc., may also be stored as contents. In addition, the electronic apparatus may also be a personal computer, a tablet terminal, etc., in which software such as a musical instrument application is installed.

The numerical values given in the above embodiment are examples, and it is naturally possible to adopt other numerical values.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A recommendation information output system, comprising:

an electronic musical instrument configured to store a plurality of contents being tone data usable in the electronic musical instrument and to produce a musical sound from the tone data;

a frequency obtaining means comprising a processor, obtaining, from the electronic musical instrument, a user identifier specifying a user at a time when the electronic musical instrument is used through a portable terminal, a content identifier specifying a content among the plurality of contents used at the time, and a usage frequency of the content; and a frequency storage means comprising a hard disk drive, storing in association the usage frequency obtained by the frequency obtaining means with the user identifier and the content identifier; and wherein the processor is configured to calculate a correlation degree between usage frequencies of the plurality of contents in association with a request user represented by a user identifier stored in the frequency storage means and usage frequencies of the plurality of contents in association with a user other than the request user stored in the frequency storage means, and to output and display information as a recommendation information to the portable terminal, wherein the recommendation information is information relating to a recommendation content specified from the plurality of contents in accordance with the correlation degree and in association with the user identifier stored in the frequency storage means, wherein the processor is configured to specify a user with a first content among the plurality of contents having a highest calculated correlation degree as a similar user, then calculate usage frequency differences between usage frequencies corresponding to the plurality of contents in association with the similar user and the usage frequencies corresponding to the plurality of contents in association with the request user, and output information relating to a second content among the plurality of contents having a biggest difference among the usage frequency differences as the recommendation information to the portable terminal, wherein the electronic musical instrument is configured to store the recommendation information as added tone data to produce the musical sound with the added tone data.

2. The recommendation information output system as claimed in claim 1, wherein the usage frequencies are any one of counts of times that the tone data are used in the electronic musical instrument, counts of times that the tone data are edited in the electronic musical instrument, and time during which the tone data are used.

3. The recommendation information output system as claimed in claim 2, wherein the tone data is configured as comprising one of a waveform data used by the electronic musical instrument in a sound producing process and a sound production control data used for control of the sound producing process, and the tone data being used in the electronic musical instrument is a state of setting the tone data to able to produce sounds with respect to a sound production instruction to the electronic musical instrument.

4. A recommendation information output system, comprising:

an electronic musical instrument configured to store a plurality of contents being tone data usable in the electronic musical instrument and to produce a musical sound from the tone data;

a frequency storage means comprising a hard disk drive, storing in association, from the electronic musical instrument, a user identifier specifying a user at a time when the electronic musical instrument is used through a portable terminal, a content identifier specifying a content among the plurality of contents used at the time, and a usage frequency of the content; and a processor configured to calculate a correlation degree between usage frequencies of the plurality of contents and in association with a request user represented by a user identifier stored in the frequency storage means and usage frequencies of the plurality of contents in association with a user other than the request user stored in the frequency storage means, and to output and display information as a recommendation information to the portable terminal, wherein the recommendation information is information relating to a recommendation content specified from the plurality of contents in accordance with the correlation degree and in association with the user identifier stored in the frequency storage means, wherein the processor is configured to specify a user with a first content among the plurality of contents having a highest calculated correlation degree as a similar user, then calculate usage frequency differences between usage frequencies corresponding to the plurality of contents in association with the similar user and the usage frequencies corresponding to the plurality of contents in association with the request user, and output information relating to a second content among the plurality of contents having a biggest difference among the usage frequency differences as the recommendation information to the portable terminal, wherein the electronic musical instrument is configured to store the recommendation information as added tone data to produce the musical sound with the added tone data.

5. The recommendation information output system as claimed in claim 4, wherein the usage frequencies are any one of counts of times that the tone data are used in the electronic musical instrument, counts of times that the tone data are edited in the electronic musical instrument, and time during which the tone data are used.

6. The recommendation information output system as claimed in claim 5, wherein the tone data is configured as comprising one of a waveform data used by the electronic musical instrument in a sound producing process and a sound production control data used for control of the sound producing process, and the tone data being used in the electronic musical instrument is a state of setting the tone data to able to produce sounds with respect to a sound production instruction to the electronic musical instrument.

7. A recommendation information output method, comprising:

providing an electronic musical instrument storing a plurality of contents being tone data usable in the electronic musical instrument to produce a musical sound from the tone data;

a frequency obtaining step of obtaining by a processor, from the electronic musical instrument, a user identifier specifying a user at a time when the electronic musical instrument is used through a portable terminal, a content identifier specifying a content among the plurality of contents used at the time, and a usage frequency of the content;

a frequency storage step of storing in association the usage frequency obtained in the frequency obtaining step with the user identifier and the content identifier in a frequency storage means in a hard disk drive; and calculating by the processor to calculate a correlation degree between usage frequencies of the plurality of contents in association with a request user represented by a user identifier stored in the frequency storage step and usage frequencies of the plurality of contents in association with a user other than the request user stored in the frequency storage step, and outputting and displaying information as a recommendation information to the portable terminal, wherein the recommendation information is information relating to a recommendation content specified from the plurality of contents in accordance with the correlation degree and in association with the user identifier stored in the frequency storage step, specifying a user with a first content among the plurality of contents having a highest calculated correlation degree as a similar user by the processor, then calculate usage frequency differences between usage frequencies corresponding to the plurality of contents in association with the similar user and the usage frequencies corresponding to the plurality of contents in association with the request user, and outputting information relating to a second content among the plurality of contents having a biggest difference among the usage frequency differences as the recommendation information to the portable terminal, storing the recommendation information in the electronic musical instrument as added tone data to produce the musical sound with the added tone data.

8. The recommendation information output method as claimed in claim 7, wherein the usage frequencies are any one of counts of times that the tone data are used in the electronic musical instrument, counts of times that the tone data are edited in the electronic musical instrument, and time during which the tone data are used.

9. The recommendation information output method as claimed in claim 8, wherein the tone data is configured as comprising one of a waveform data used by the electronic musical instrument in a sound producing process and a sound production control data used for control of the sound producing process, and the tone data being used in the electronic musical instrument is a state of setting the tone data to able to produce sounds with respect to a sound production instruction to the electronic musical instrument.

* * * * *